March 29, 1960
C. A. DICKEY
2,930,816
PRODUCTION OF DIMETHYLSULFIDE
Filed Sept. 13, 1957
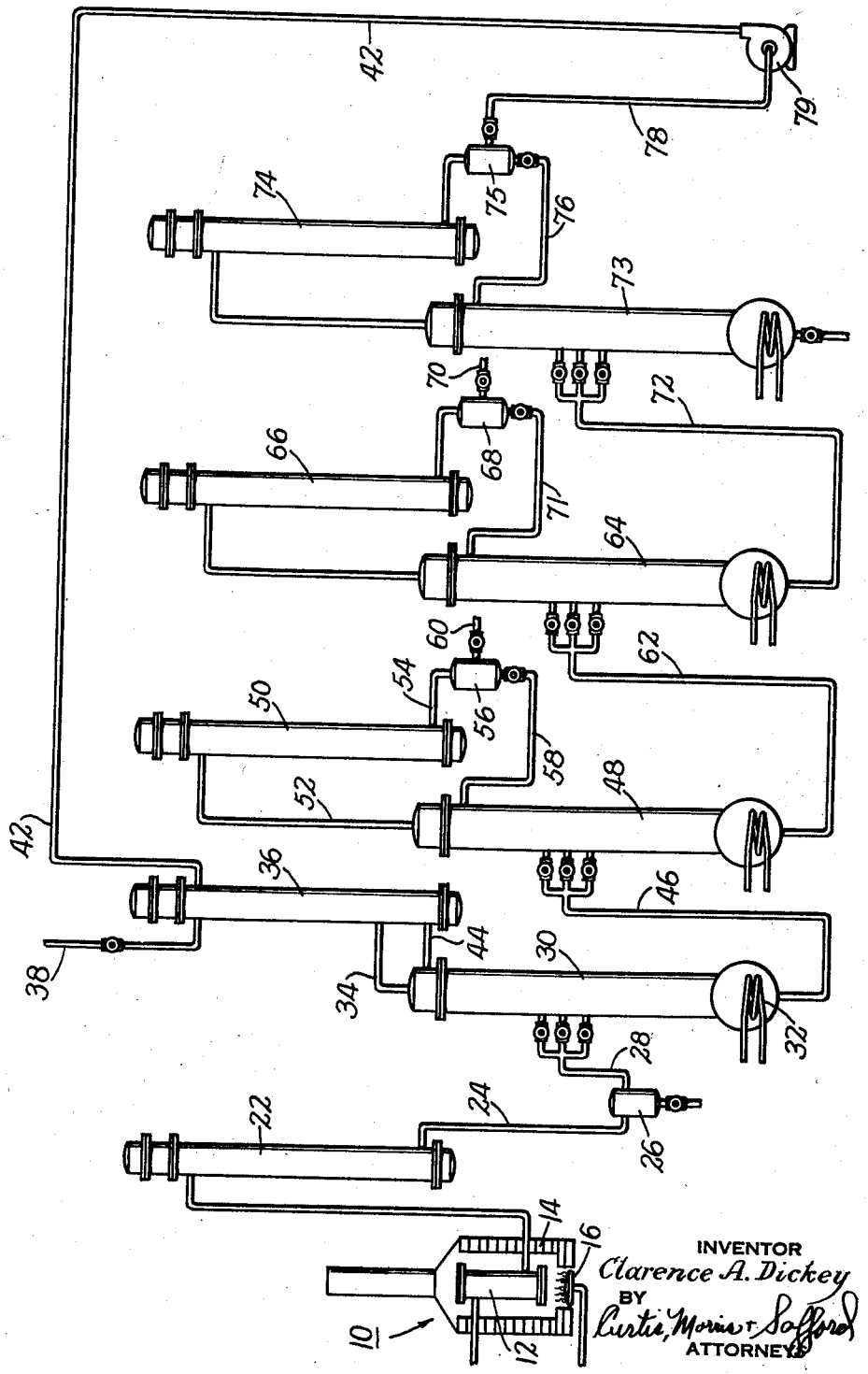
INVENTOR
Clarence A. Dickey
BY
Curtis, Morris & Safford
ATTORNEYS

United States Patent Office 2,930,816
Patented Mar. 29, 1960

2,930,816
PRODUCTION OF DIMETHYLSULFIDE

Clarence A. Dickey, Houston, Tex., assignor, by mesne assignments, to Pennsalt Chemicals Corporation, Philadelphia, Pa., a corporation of Pennsylvania Application September 13, 1957, Serial No. 683,896

4 Claims. (Cl. 260—609)

This invention is concerned with a novel and improved process for the manufacture of dimethylsulfide. Dimethylsulfide is used for example as a constituent for odorizing compositions for the odorizing of fuel gases and is also useful as an intermediate in the preparation of a variety of chemical products.

It is a principal object of the present invention to provide a method whereby dimethylsulfide of high purity can be made in good yield from relatively inexpensive raw materials. In general this object is achieved by bringing a mixture of the vapors of carbon disulfide and alcohol into contact with a catalyst at an elevated temperature to form a reaction product containing a major proportion of dimethylsulfide and recovering dimethylsulfide from the reaction product in substantially pure form. It has been found that carbon disulfide and methanol react under the conditions described in detail hereafter to produce exceptionally good yields of dimethylsulfide. While some side reactions occur the predominant reaction appears to be that represented by the following equation:

$$4MeOH + CS_2 \rightarrow 2Me_2S + 2H_2O + CO_2$$

It has been further found that this reaction appears to be unique since homologues of methanol such as ethanol, propanol and butanol do not give a comparable result. For example, when ethanol is treated with carbon disulfide under the conditions described herein a relatively poor yield of diethylsulfide is obtained and when the higher homologues such as propanol and butanol are treated with carbon disulfide under these conditions no more than a trace of the dialkylsulfide is produced. Thus the fact that an exceptionally high yield of dimethylsulfide can be achieved in accordance with the present invention is a surprising and unexpected result.

As pointed out above, in accordance with the present process a mixture of the vapors of carbon disulfide and methanol is brought into contact with a catalyst at an elevated temperature, preferably by passing the vapor mixture over the catalyst. In general the catalysts useful in the present process are the same as those previously used for the reaction between alkanols and hydrogen sulfide to form mercaptans. Examples of such catalysts are the oxides of metals such as aluminum, thorium, tungsten, silicon, manganese, uranium, chromium, cobalt, nickel, titanium, zirconium, iron, beryllium, vanadium, zinc and molybdenum. Other catalysts that can be used are metal sulfides such as iron sulfide and cadmium sulfide, the so-called clay type catalysts, zinc chloride, phosphoric acid and activated carbon or charcoal. Good results have been obtained using commercially available activated alumina and silica gel as catalysts.

It has been found that to achieve an optimum yield of dialkyl sulfide the feed material should be mixed in approximately the proportions indicated by the above equation, that is four mols of alkanol per mol of carbon disulfide. However, this ratio can be varied somewhat and satisfactory yields of the sulfide obtained. More particularly mixtures containing 2 to 6 mols of alkanol per mol of carbon disulfide can be used satisfactorily.

The operation appears to proceed satisfactorily at substantially any pressure. However, in general, it is preferable to carry out the reaction at pressures not substantially above atmospheric pressure in order to avoid the additional cost of high pressure operation. The reaction proceeds satisfactorily at temperatures of 450° F. to 1200° F. or higher with the preferred range being 700° F. to 1000° F. When a feed ratio of 4 mols of alkanol to 1 mol of carbon disulfide is used, the optimum yield of dialkyl sulfide is obtained at a temperature in the neighborhood of 750° F. The reaction, when carried out under the conditions outlined above, appears to be practically instantaneous, and only a very short length of catalyst bed need be used. Space velocities of 50 to 500 volumes of gas per hour per volume of catalyst appear to be satisfactory with a space velocity of the order of 150 being preferred.

The nature of the present invention may be conveniently explained further by reference to the accompanying drawing which illustrates diagrammatically apparatus capable of being used to carry out the process on a continuous basis. Referring to the drawing, numeral 10 generally designates a reactor comprising a catalyst chamber 12 which may contain a bed of a suitable catalyst and which is mounted in a furnace 14 having a burner or other suitable heating device 16 for maintaining the catalyst chamber 12 at the desired predetermined temperature.

A mixture of the vapors of methyl alcohol and carbon disulfide is fed through a pipe 18 to the catalyst chamber 12 which is maintained at an elevated temperature within the range indicated above. The feed mixture reacts to form a product containing a major proportion of dimethylsulfide and minor proportions of methyl mercaptan, carbon dioxide and hydrogen sulfide, as well as small quantities of unreacted alcohol and carbon disulfide. From the catalyst chamber 12 the reaction products flow through a pipe 20 to a cooler 22 and thence through a pipe 24 to a trap 26 wherein any condensed liquids are entrapped.

From the trap 26 the vapors flow through a pipe 28 to a fractionating absorber 30 wherein a separation is effected between dimethylsulfide, methyl mercaptan and the other less volatile constituents on the one hand and hydrogen sulfide and carbon dioxide on the other hand. This separation is effected by causing a suitable absorbent such as toluene as an absorbent to flow downwardly through the tower 30 and providing heat by means of a steam coil 32 at the base of the tower. As a result of fractionation within the tower 30, the methyl mercaptan, dimethyl sulfide and solvent move downwardly through tower 30 and the hydrogen sulfide and carbon dioxide move upwardly and flow through pipe 34 to the bottom of a cooler 36, thence out of the cooler through a vent pipe 38.

The toluene used as an absorbent flows in a closed cycle as will be more fully described hereafter. It is fed to the absorption system near the top of cooler 36 through a pipe 42 and flows down through the cooler and thence into tower 30 through a pipe 44. As it flows through the tower it selectively absorbs the dimethylsulfide and methyl mercaptan and the resulting mixture is transferred through pipe 46 to a fractionating tower 48 which functions to strip off the methyl mercaptan. The tower 48 is associated with a condenser 50. Mercaptan vapors from the top of tower 48 flow in the usual manner through a pipe 52 to condenser 50, and the condensed mercaptan then flows through pipe 54 to tank 56. Reflux is conducted from tank 56 through a pipe 58 back to tower 48 and product methyl mercaptan is withdrawn from tank 56 through a pipe 60.

The dimethylsulfide and toluene which are separated from the mercaptan in tower 48 flow through a pipe 62 to a fractionating tower 64 which functions to strip off the dimethylsulfide. The tower 64 is provided with a condenser 66 similar to the condenser 50 and condensed product flows to a tank 68 which is similar to tank 56. Product dimethylsulfide is withdrawn from tank 58 through a pipe 70 and reflux is returned to tower 64 through pipe 74. The toluene separated by tower 64 flows from the bottom of tower 64 through a pipe 72 to a refining tower 73.

The tower 73 operates to separate the toluene from certain heavy residues formed in the process. It is provided with a condenser 74 similar to the condenser 50 and condensed product flows to a tank 75 which is similar to tank 56. Reflux is returned to tower 73 from tank 75 through a pipe 76 and heavy residues are withdrawn at the base of tower 73 through a pipe 77. The refined toluene product flows from tank 75 through a pipe 78 to the suction side of a pump 79 by means of which it is pumped through pipe 42 back to the top cooler 36.

In order to point out still further the nature of the present invention the following specific examples are given to illustrate a preferred embodiment and several modifications of the present process.

*Example 1*

A feed mixture of the vapors of methanol and carbon disulfide having a molar ratio of 4:1 was used and the mixture was passed over an activated alumina catalyst in the manner described above. The pressure was maintained at 60 p.s.i. gauge and the temperature at 750° F. with a space velocity of about 140 through the catalyst bed. The reaction products were separated in the manner previously described. It was found that about 80% of the alcohol was converted to dimethylsulfide and an additional 10% to methyl mercaptan.

*Example 2*

The procedure of Example 1 was followed except that a methanol-carbon disulfide feed ratio of 3.8:1 was used. Analysis of the product showed that 82% of the alcohol had been converted to dimethylsulfide and 9% to methyl mercaptan.

*Example 3*

The procedure of Example 1 was followed except that a methanol-carbon disulfide feed ratio of 3:1 was used. Analysis of the reaction products showed a 70% conversion of alcohol to dimethylsulfide with an additional 21% of the alcohol being converted to methyl mercaptan.

*Example 4*

The procedure of Example 1 was followed except that a silica gel catalyst was used in place of the activated alumina catalyst of Example 1. An alcohol-$CS_2$ ratio of 2.9:1 was employed. Analysis of the reaction product showed that 51.8% of the feed methanol was converted to dimethylsulfide and an additional 5.8% of the alcohol was converted to methyl mercaptan.

*Example 5*

The procedure of Example 1 was followed except that the catalyst was 10% thoria on alumina and an alcohol-$CS_2$ ratio of 3.8:1 was used. The reaction product contained 78.6% dimethylsulfide and 13.9% methyl mercaptan.

In the foregoing examples the methyl mercaptan formed can be separated and recycled to improve the overall yield of dimethylsulfide. However, in cases where the yield of dimethylsulfide obtained in a single pass over the catalyst is of the order of 80% the additional yield attained by recycling the mercaptan cannot ordinarily be justified on an economic basis.

A certain amount of hydrogen sulfide is formed in the course of the reaction and it is possible to recycle this hydrogen sulfide. However, since the hydrogen sulfide is mixed with a significant amount of carbon dioxide, recycling of the hydrogen sulfide is not ordinarily economically feasible except in those cases where it might be found desirable to use the hydrogen sulfide-carbon dioxide mixture as a diluent of the feed to control the temperature within the reaction chamber 10.

From the foregoing description it should be apparent that the present invention provides a process capable of achieving the several objects set forth at the beginning of the present specification. The reaction proceeds so rapidly that only a very short catalyst contact time need be used and undesired side reactions are largely suppressed. When operating under the conditions described above combined yields of dimethylsulfide and methyl mercaptan of the order of 90% or more have been achieved.

It is of course to be understood that the foregoing description is illustrative only and that numerous changes can be made within the scope of the invention. Thus absorbents other than toluene can be used in the fractionating absorber 30. For example, benzol as well as a number of other aromatic or aliphatic hydrocarbons provide a satisfactory absorbent medium and permit an acceptable separation of the hydrogen sulfide from the dialkylsulfide and mercaptan. Other modifications within the scope of the invention will be apparent to those skilled in the art.

This application is a continuation-in-part of my prior application Serial No. 421,099, filed on April 5, 1954, now abandoned.

I claim:

1. The method of making dimethylsulfide which comprises, passing over a catalyst selected from a group consisting of alumina, silica and thoria at a temperature of 700° F. to 1000° F. a mixture of the vapors of methanol and carbon disulfide in a molar ratio between 2:1 and 6:1 to form a reaction product containing a major proportion of dimethylsulfide and recovering the dimethylsulfide from the reaction product in substantially pure form.

2. A method according to claim 1 and wherein said catalyst is essentially composed of alumina.

3. A method according to claim 1 and wherein said catalyst is essentially composed of silica.

4. A method according to claim 1 and wherein said catalyst is essentially composed of thoria on an alumina substrate.

References Cited in the file of this patent

UNITED STATES PATENTS 2,667,515     Beach et al.            Jan. 26, 1954

OTHER REFERENCES

Gilfillan: J. Am. Chem. Soc., 44, 1323–1333 (1922).